(No Model.)
S. D. LOUNT.
COMPRESSING PUMP FOR AIR, GASES, AND ELASTIC VAPORS.
No. 251,373. Patented Dec. 27, 1881.
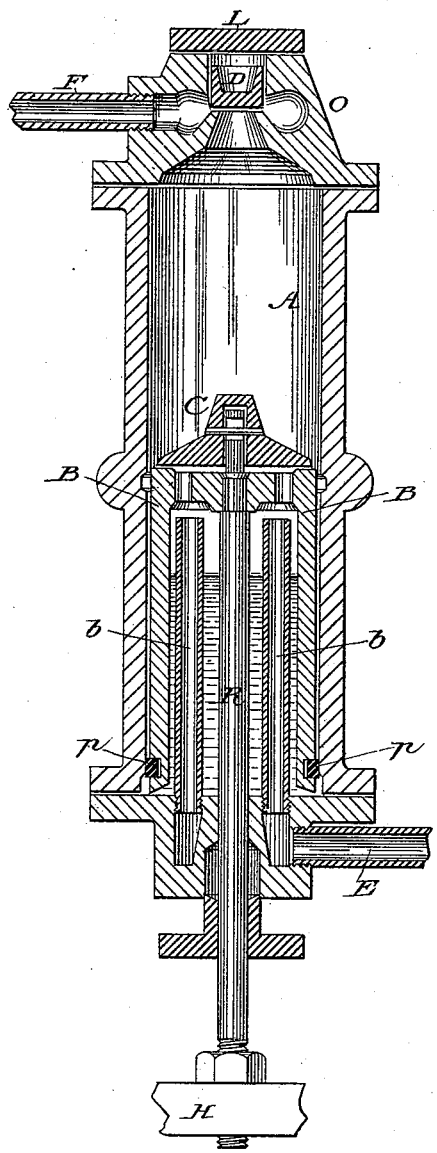

UNITED STATES PATENT OFFICE.

SAMUEL D. LOUNT, OF PHŒNIX, ARIZONA TERRITORY.

COMPRESSING-PUMP FOR AIR, GASES, AND ELASTIC VAPORS.

SPECIFICATION forming part of Letters Patent No. 251,373, dated December 27, 1881.

Application filed March 31, 1881. (No model.)

*To all whom it may concern:*

Be it known that I, SAML. D. LOUNT, of Phœnix, in the county of Maricopa and Territory of Arizona, have invented new and useful Improvements in Compressing-Pumps for Air, Gases, and Elastic Vapors; and I do hereby declare the following to be a full, clear, and exact description thereof, reference being had to the accompanying drawings, making a part of this specification.

The object of my invention is the production of a simple and effective compressing-pump which is readily accessible for repairs, and within which the packing and the surfaces which are exposed to friction are not brought into contact with the compressed and heated air or vapor.

My invention further consists in the combination, within the cylinder of a compressing-pump, of an inverted cup-shaped piston with a reservoir for containing a lubricant, so constructed that all the parts which are exposed to friction are at all times abundantly lubricated from said reservoir, while said lubricant is not allowed access to the compressed and heated air or vapor; also, in constructing said reservoir with a channel or channels passing through the same, through which channels the uncompressed air or vapor passes for the purpose of keeping said lubricant cool.

In the annexed drawings, A represents the cylinder of the pump, within which is placed the inverted-cup-shaped piston B B, with a valve, C, on the upper end and a packing-ring pipe near the lower end.

D is the outlet-valve; E, the inlet and F the outlet pipe.

The upper surface of the valve C should be turned to fit the upper end of the cylinder A, as shown in the drawings, in order that the piston may be adjusted by means of the screw-thread on the lower end of the rod R, so as to force all the air or vapor which is between the valves through the upper valve when the piston arrives at the upper end of its stroke.

Access can be had to the valves by removing the cap L and cylinder-head O.

If the outlet-pipe F is carried horizontally a few feet from the pump, it will spring sufficiently to allow the cylinder-head to be lifted from the cylinder and placed to one side, entirely out of the line of the bore of the cylinder, thus allowing the piston and rod to be unscrewed from the cross-head H and removed from the pump without breaking any joint except the one under the cylinder-head. When the piston B is moved upward the air or vapor to be compressed is drawn from the inlet-pipe E through the pipes or channels $b\ b$ into the space below the piston, and on the return-stroke of the piston the air or vapor passes through the cup inside the piston and the valve C to the compression-chamber above the piston, where it is compressed by the following stroke of the piston and forced through the valve D to the outlet-pipe F. Now the heat which is generated by compression is all developed at the upper end of the cylinder A. The upper and closed end of the piston B passes at each stroke through this heated chamber, but the packing-ring $p\ p$, being separated from this closed end by the thin wall of the cup, cannot become heated, for it will be observed that the interior of the piston B is always in contact with the uncompressed and consequently cool air or vapor, which readily abstracts the heat that is conducted from the compressing-chamber by the metal of the piston and cylinder from the thin wall surrounding the cup, and also from the lower portion of the cylinder A, after which it is transferred to the compressing-chamber above before it can accumulate sufficient heat to decompose the lubricant or damage any of the parts exposed to friction.

When the pump is to be put under a heavy pressure the piston B should be made longer than its stroke in order that the packing-ring $p\ p$ shall never travel over any portion of the cylinder which has been in contact with the compressed air or vapor, except the minute quantity which is forced around the piston above the ring $p\ p$, and the heat from this is readily transferred through the thin wall of the cup.

Compressing-pumps, when working under a heavy pressure, require abundant lubrication, and if the lubricant employed is allowed to come in contact with the heated air or vapor it will soon be decomposed and fail to perform the service for which it is used, thus necessitating the frequent introduction of a fresh supply, and the advantage of keeping the wearing parts constantly bathed with a pure and cool lubricant will be readily seen. This object is accomplished in my invention as follows: The inlet-pipe E does not communicate directly with the lower end of the cylinder A, but through one or more pipes, b b, which pipes terminate below the closed end of the cup-shaped piston, and above the lower edge of the same when said piston is at the lowest part of its stroke, thus forming a reservoir at the lower end of the cylinder A, and this reservoir can be kept full or partly full of any lubricating-liquid, which will not be disturbed by the air or vapor passing through the pump, and it will be kept at all times cool by the passage of the air or vapor through the said pipes b b. This liquid is always in contact with the piston-rod, (if said rod passes through a stuffing-box at the lower end of the cylinder,) and the lower end of the piston B, with the packing-ring p p, is immersed in said liquid at each stroke of the piston. If required, the piston B and pipes b b can be made long enough to keep the lower end of the piston, with the packing-ring p p, at all times immersed in said liquid.

A compressing-pump constructed as above described does not require any water-jacket, or the application of any cooling medium whatever, except the air or vapor which is pressed through the pump; and another important advantage is that the lubricant employed is always applied with certainty and in abundance to all the wearing parts, while said lubricant is not allowed access to the compressing-chamber of the pump, (except the small amount which will work through the joints,) thus insuring the least possible amount of wear in the machine, and avoiding not only the loss of the lubricant, but the trouble and annoyance which are caused by the presence of the lubricant and its decomposed products in the pipes and receptacles into which the air or vapor is discharged after leaving the compressing-chamber of the pump.

I have operated a pump of this construction for compresing the vapor of ammonia to a tension of one hundred and twenty to one hundred and eighty pounds to the square inch continuously day and night, without ever having the piston-rod or lower half of the cylinder at a higher temperature than blood-heat, although the upper end of the cylinder was at a temperature much above the boiling-point of water, and after eight months' continuous service the inside of the cylinder showed no perceptible wear.

When the pump is used for compressing air one of the pipes b can be placed in the center of the cylinder and the piston-rod passed through, but not in contact with said pipe, in which case no stuffing-box will be needed around the rod, as the pipe through which the rod passes will retain the lubricant in the reservoir.

If the pump is not required to operate under a pressure which will generate sufficient heat to decompose the lubricant or injure the working parts, the cup-shaped piston need not be made as long as its stroke; nor will it be necessary to place the inlet-valve upon the upper end of the piston, as both the outlet and inlet valves can be placed on the upper end of the cylinder and the inlet-pipe E made to communicate with the inlet-valve and also with the pipes b b. This arrangement would secure one of the objects of my invention—viz., a cup-shaped piston in combination with a lubricating-reservoir, into which the lower edge of the piston would be immersed at each stroke of the piston, thus insuring the thorough lubrication of the pump without allowing the lubricant access to the compressed air or vapor; but it would not prove as satisfactory as the arrangement shown in the drawings when the pump was required to perform heavy service, for the short piston would allow the compressed and heater air or vapor to come in contact with a portion of the cylinder over which the piston-packing traveled, and if both valves were placed on the head of the cylinder the air or vapor within the cup of the piston would not be transferred at each stroke of the piston to the compression side of the same, but practically the same portion of the air or vapor would be repeatedly drawn into the cup of the piston and again forced out, and of course this air or vapor would soon acquire a high temperature from the heat, which would be conducted from the compression side of the piston by the metal of the piston and cylinder.

I am aware that cup-shaped or trunk pistons have long been in use, both for pumps and engines; but, so far as my knowledge extends, they have only been employed for the purpose of securing steadiness of motion in the piston when the joint of a connecting-rod was placed inside the piston; and I do not claim, broadly, the use of a cup-shaped piston within the cylinder of a compressing-pump; but What I do claim as new, and desire to secure by Letters Patent, is—

1. A compressing-pump consisting of an upright cylinder with a valve on the upper head, combined with an inverted-cup-shaped piston placed within said cylinder and provided with a valve on the upper end and a packing-ring or its equivalent near the lower end, said piston being attached to and operated by a rod or its equivalent, and said packing-ring being at all times in contact with the interior of the cylinder, substantially as and for the purposes set forth.

2. The combination, within the upright cylinder of a compressing-pump, of an inverted-cup-shaped piston with a lubricating-reservoir so constructed that the open end of the cup-shaped piston is immersed in the lubricant at each stroke of the piston, and the lubricant is not allowed access to the compressed air or vapor, substantially as and for the purposes specified.

3. A compressing-pump consisting of an upright cylinder, with a valve on the upper head, and an inverted-cup-shaped piston within said cylinder, provided with a valve on the upper end and a packing-ring or its equivalent near
5 the lower end, said piston being attached to and operated by a rod or its equivalent, in combination with a lubricating-reservoir having a channel or channels through the same for the passage of the uncompressed air or vapor, substantially as and for the purposes set forth.

SAML. D. LOUNT.

Witnesses:
  L. E. BURBEY,
  M. W. KALES.